(12) United States Patent
Sharma et al.

(10) Patent No.: US 10,122,437 B2
(45) Date of Patent: Nov. 6, 2018

(54) COMMUNICATION SYSTEM

(71) Applicant: NEC Corporation, Tokyo (JP)

(72) Inventors: Vivek Sharma, London (GB); Yassin Aden Awad, London (GB)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 14/413,406

(22) PCT Filed: Jun. 27, 2013

(86) PCT No.: PCT/JP2013/068314
§ 371 (c)(1),
(2) Date: Jan. 7, 2015

(87) PCT Pub. No.: WO2014/010494
PCT Pub. Date: Jan. 16, 2014

(65) Prior Publication Data
US 2015/0195032 A1    Jul. 9, 2015

(30) Foreign Application Priority Data
Jul. 12, 2012    (GB) .................................. 1212440.0

(51) Int. Cl.
*H04B 7/155* (2006.01)
*H04W 88/04* (2009.01)

(52) U.S. Cl.
CPC ..... *H04B 7/15557* (2013.01); *H04B 7/15507* (2013.01); *H04B 7/15592* (2013.01); *H04W 88/04* (2013.01)

(58) Field of Classification Search
CPC ............ H04W 72/1221; H04W 84/047; H04B 7/2606; H04B 7/155
See application file for complete search history.

(56) References Cited

U.S. PATENT DOCUMENTS

2008/0039015 A1    2/2008  Nakata et al.
2008/0085709 A1    4/2008  Jeon et al.
(Continued)

FOREIGN PATENT DOCUMENTS

EP          2330863 A2   6/2011
JP       2011-135439 A   7/2011
(Continued)

OTHER PUBLICATIONS

3GPP TR 36.819 v11.1.0 Dec. 2011.*
(Continued)

*Primary Examiner* — Jung Liu
(74) *Attorney, Agent, or Firm* — Wilmer Cutler Pickering Hale and Dorr LLP

(57) ABSTRACT

The invention provides a relay node that can relay received data to one or more communications devices served by the relay node. The relay node has transceiver circuitry that transmits signals to and that receives signals from one or more remote transmission points and the one or more communications devices served by the relay node; and a communications control module for controlling the operation of the relay node such that in a first operating state the relay node is configured to receive data to be relayed, from a remote transmission point and such that in a second operating state the relay station is configured to receive data to be relayed, from a plurality of remote and separate transmission points.

19 Claims, 10 Drawing Sheets

(56) References Cited

U.S. PATENT DOCUMENTS

| | | | |
|---|---|---|---|
| 2009/0196214 A1 | 8/2009 | Li et al. | |
| 2009/0207778 A1* | 8/2009 | Wang | H04B 7/026 370/315 |
| 2010/0103845 A1* | 4/2010 | Ulupinar | H04L 29/12207 370/254 |
| 2010/0272007 A1* | 10/2010 | Shen | H04B 7/2606 370/315 |
| 2011/0080890 A1* | 4/2011 | Cai | H04W 36/0033 370/331 |
| 2011/0103287 A1 | 5/2011 | Ma et al. | |
| 2011/0110288 A1 | 5/2011 | Manssour | |
| 2011/0228700 A1* | 9/2011 | Mildh | H04B 7/2606 370/254 |
| 2011/0280127 A1* | 11/2011 | Raaf | H04L 45/125 370/230 |
| 2012/0020273 A1 | 1/2012 | Mori | |
| 2012/0039471 A1* | 2/2012 | Kim | H04W 12/02 380/270 |
| 2012/0127915 A1* | 5/2012 | Moberg | H04B 7/155 370/315 |
| 2012/0155355 A1* | 6/2012 | Kwon | H04W 76/048 370/311 |
| 2012/0236782 A1* | 9/2012 | Bucknell | H04B 7/155 370/315 |
| 2013/0023204 A1 | 1/2013 | Ode et al. | |
| 2013/0070663 A1* | 3/2013 | Gunnarsson | H04W 36/0083 370/315 |

FOREIGN PATENT DOCUMENTS

| | | |
|---|---|---|
| WO | WO-2005/081558 A1 | 9/2005 |
| WO | WO-2011/013410 A1 | 2/2011 |
| WO | WO-2011/121714 A1 | 10/2011 |
| WO | WO-2012028200 A1 | 3/2012 |
| WO | WO-2012037958 A1 | 3/2012 |

OTHER PUBLICATIONS

DAC-UPC, "Proposal of a CoMP study focused on relay-based networks," 3GPP TSG-RAN WG1 #66, R1-112096, Agenda Item 6.5.5, Athens, Greece, 8 pages (Aug. 22-26, 2011).

Huawei, "Discussion on relay in CoMP," 3GPP TSG RAN WG1 meeting #57bis, R1-092371, Los Angeles, 3 pages (Jun. 29-Jul. 3, 2009).

InterDigital, "Proposed Way Forward for LTE-A Relay Type II," 3GPP TSG-RAN WG1 Meeting #57bis, R1-092588, Los Angeles, 6 pages (Jun. 29-Jul. 3, 2009).

Japanese Office Action issued by the Japan Patent Office for Application No. 2015-516873 dated Nov. 25, 2015 (3 pages—Japanese language only).

LG Electronics Inc., "Considerations on coexistence of different types of relays," TSG-RAN WG1 Meeting #57, R1-092117, San Francisco, 2 pages (May 4-8, 2009).

3GPP TR 36.814 V2.0.0 (Mar. 2010) Further Advancements for E-UTRA Physical Layer Aspects (Release 9) (103 pages).

3GPP TR 36.819 V11.1.0 (Dec. 2011) Coordinated multi-point operation for LTE physical layer aspects (Release 11) (69 pages).

3GPP TS 36.300 V11.1.0 (Mar. 2012) "Evolved Universal Terrestrial Radio Access (E-UTRA) and Evolved Universal Terrestrial Radio Access Network (E-UTRAN)," Stage 2 (Release 11), 194 pages.

Christoph Hausl and Philipe Dupraz, "Joint Network-Channel Coding for the Multiple-Access Relay Channel" Prc. Intern. Workshop on Wireless Ad-hoc and Senior Network (IWWAN), 2006 (6 pages).

International Search Report corresponding to PCT/JP2013/068314 dated Dec. 4, 2013 (6 pages).

United Kingdom Search Report corresponding to GB1212440.0 dated Nov. 12, 2012 (2 pages).

Japanese Office Action issued by the Japan Patent Office for Application No. 2015-516873 dated May 6, 2016 (5 pages).

Nakatsugawa, K. and Viorel, D., "A proposal for introducing a shared RS system in MR," IEEE 802.16 Broadband Wireless Access Working Group, 8 pages (Jan. 8, 2007).

Japanese Office Action issued in Corresponding Japanese Application No. 2015-516873, dated Sep. 7, 2016, 5 pages.

* cited by examiner

COMMUNICATION SYSTEM

CROSS-REFERENCE TO RELATED APPLICATIONS

This application is a national stage application of International Application No. PCT/JP2013/068314 entitled "COMMUNICATION SYSTEM" filed on Jun. 27, 2013, which claims priority to United Kingdom Application No. 1212440.0 filed on Jul. 12, 2012, the disclosures of which are hereby incorporated by reference in their entirety.

TECHNICAL FIELD

The present invention relates to a communication system and to components thereof for providing communication services to mobile or fixed communication devices. The invention has particular but not exclusive relevance to providing improved communication links to relay nodes (RNs) in Long Term Evolution (LTE) communication systems currently being developed by the 3$^{rd}$ Generation Partnership Project (3GPP).

BACKGROUND ART

Relay nodes were introduced in Rel-10 of the 3GPP standards documentation to provide coverage extension within the cell operated by a base station (eNB), as a tool to improve, for example, the coverage of high data rates for User Equipment (UE), temporary network deployment, cell edge throughput and/or to provide coverage in new cell areas. Mobile RNs (MRNs) are also included in Rel-11 as a study item and the deployment use case is limited to high speed trains where the relay node in mounted on and moves with the train. The LTE specifications support relaying by having a Relay Node (RN) wirelessly connected to a base station (referred to as a Donor eNB (DeNB)). In addition to serving its own 'donor' cell, the Donor eNB serves the RN, via a modified version of the Evolved Universal Terrestrial Radio Access (E-UTRA) radio interface. The modified interface is referred to as the 'RN-Un' interface.

Each RN is provided with many aspects of a base station's functionality and is therefore capable of acting as a base station serving user equipment in its own 'relay' cell via a wireless interface referred to as the 'RN-Uu' interface. From the perspective of the user equipment in the relay cell, therefore, the RN essentially appears to be a conventional LTE base station. Typically a RN will be serving multiple UEs so the aggregated data for all these UEs must pass over the RN-Un interface. In addition to the base station functionality, however, the RN also supports a subset of the UE functionality including, for example, many aspects of the physical layer, layer-2, radio resource control (RRC), and non access stratum (NAS) functionality, to allow it to connect wirelessly to the Donor eNB (DeNB).

The DeNB is capable of handling communication 'directly' to and from user equipment camped in its own cell via a conventional 'Uu' interface between the DeNB and the user equipment. The DeNB is also capable of handling communication 'indirectly' with user equipment camped in the relay cell, via the RN-Un interface, the RN, and the RN-Uu interface.

As those skilled in the art will understand, conventional eNBs have the capability of interconnecting with one another via an interface referred to as the 'X2' interface. The eNBs also connect to a core network comprising an Evolved Packet Core (EPC) by means of an interface referred to as the 'S1' interface and, more specifically, to a Mobility Management Entity (MME) of the EPC via an 'S1-MME' interface and to a Serving Gateway (S-GW) by means of an 'S1-U' interface.

The DeNB is therefore required to provide S1 and X2 proxy functionality between the RN and other network nodes (other eNBs, MMEs and S-GWs) meaning that, depending on the context, the DeNB appears as an MME (for S1), an eNB (for X2) and an S-GW, to the RN. Thus, in addition to terminating the conventional radio protocols of the modified E-UTRA radio interface (RN-Un), the RN is also capable of terminating the protocols of the S1, S11 and X2 interfaces.

The 3GPP standards documentation defines in Section 4.7 of TS 36.300 v11.1.0 (the content of which is herein incorporated by reference) the architecture of RNs and the way in which they establish connections with the DeNB. The 3GPP standards documentation defines in Section 9 of TR 36.814 v2.0.0 (the content of which is herein incorporated by reference) different types of RN in Rel-10 which differ in the way that the RN-Un interface is provided:

1. Type 1 RNs re-use the same frequency for both the RN-Uu interface (RN-to-UE) and the RN-Un interface (RN-to-DeNB) by configuring some sub-frames for RN-Uu and some for RN-Un. This may be considered as a kind of half-duplex operation.
2. Type 1a RNs use different frequencies for RN-Uu and RN-Un.
3. Type 1b RNs also re-use the same frequency for RN-Uu and RN-Un but do so by using separate isolated antennas, so that both RN-Uu and RN-Un can operate at the same time (full-duplex operation).

Type 1 RNs must share bandwidth between RN-Uu and RN-Un and this may result in lower throughput than can be achieved by Type 1a and Type 1b RNs. In the case of Type 1 there is also a need to configure the number of sub-frames assigned for the RN-Un interface such that the throughputs on the RN-Uu and RN-Un interfaces are balanced. Depending on the number of UEs being served by the relay node, this may affect the services that the relay node can provide to each UE.

SUMMARY OF INVENTION

The present invention aims to provide an improved communication system and improved components of the communication system which overcome or at least alleviate one or more of the above issues.

The present invention provides a relay node that is operable to relay received data to one or more communications devices served by the relay node, the relay node comprising: transceiver circuitry operable for transmitting signals to and for receiving signals from one or more remote transmission points and the one or more communications devices served by the relay node; and a communications control module for controlling the operation of the relay node such that in a first operating state the relay node is configured to receive data to be relayed, from a single remote transmission point and such that in a second operating state the relay station is configured to receive data to be relayed, from a plurality of remote and separate transmission points.

In one exemplary embodiment, the communications control module receives configuration data from a remote transmission point which configuration data defines if the communications control module is to operate in said first operating state or in said second operating state. Alternatively, the relay node may make this decision itself.

Typically, the relay node will also comprise a measurement module for obtaining signal measurements of signals transmitted by different transmission points within the vicinity of the relay node. The measurement module may perform the measurements and may report the measurements to a remote transmission point in response to receiving a request to perform the measurements from the remote transmission point.

In one exemplary embodiment, the second operating state comprises plural communications modes including one or more selected from the group comprising: i) joint transmission mode in which multiple transmission points send data to the relay node; ii) Coordinated Scheduling/Beam forming (CS/CB) mode in which the relay node receives transmissions from one transmission point, and the transmission points co-ordinate their scheduling and/or beam forming decisions to minimise interference between the transmissions; and iii) Dynamic Point Selection (DPS) mode in which the relay node receives transmissions from a transmission point selected from a set of co-ordinating transmission points. In this case, when operating in the DPS mode, the selected transmission point may change from one sub-frame to another based on the instantaneous radio channel conditions between the relay node and the transmission points within the set.

The invention also provides a donor base station for use in communicating with one or more relay nodes, the donor base station comprising: transceiver circuitry operable for transmitting signals to and for receiving signals from the relay node; and a communications control module configured to transmit configuration data to the relay node to configure the relay node to operate in a first operating state in which the relay node will receive data to be relayed, from the donor base station or to operate in a second operating state in which the relay station receives data to be relayed, from a plurality of remote and separate transmission points.

The donor base station may also have a measurement module that is operable to transmit a request to the relay node to perform signal measurements of signals transmitted by other transmission points within the vicinity of the relay node and that receives measurement results back from the relay node. In this case, the communications control module may determine which transmission points the relay node should communicate with in the second operating state based on the signal measurements received from the relay node.

Typically, the donor base station will comprise a proxy module that is configured to provide proxy functionality for the relay node to another network node. The proxy module may be configured to inhibit its proxy functionality if another donor base station is configured as a master donor base station when the relay node is configured to operate in said second operating state. Otherwise, when the relay node is configured to operate in the second operating state, the proxy module may be arranged to inform the another network node that plural base stations will provide proxy functionality for the relay node.

In one exemplary embodiment, the communications control module is operable to exchange information with other base stations over a base station interface (such as the X2 interface), to coordinate transmissions to the relay node when operating in said second operating state. In particular, the donor base station may exchange one or more of the following over the base station interface: i) patterns of sub-frame assignments made by the different transmission points for the relay node; ii) position information for controlling beam forming techniques used to reduce interference; iii) signal measurements reported by the relay node; iv) signalling to inform another base stations that they are serving the relay node so that the other base station can reserve appropriate resources for the relay node; v) signalling of system information for Public Warning System related information; and vi) information to coordinate resources used by each base station for R-PDCCH and MBSFN sub-frame structure.

The invention also provides a network node configured to communicate with a relay node via plural donor base stations, the network node comprising: a communications control module for controlling communications with the relay node via the plural donor base stations; and a multi-point transmission context module that is operable to maintain context data indicating if the relay node will be communicating with the network node via multiple donor base stations.

The network node may receive information from a donor base station identifying other transmission points that will transmit data to the relay node and the multi-point transmission context module maintains context data for each transmission point, whereby the communications module can establish a communication link with the relay node via each of the transmission points identified in the context data.

The invention also provides a donor base station for use in communicating with one or more relay nodes, the donor base station comprising: transceiver circuitry operable for transmitting signals to and for receiving signals from the relay node; and a proxy module configured to provide proxy functionality for the relay node to another network node, wherein the proxy module is configured to inhibit operation of the proxy functionality provided for the relay node if the donor base station receives information that another donor base station is configured as a master donor base station for the relay node.

The invention also provides corresponding methods and computer programme products for carrying out those methods, which computer programme products may be provided as a signal or on a computer readable medium such as a CD-ROM or the like.

BRIEF DESCRIPTION OF DRAWINGS

Exemplary embodiments of the invention will now be described, by way of example only, with reference to the attached figures in which.

DESCRIPTION OF EMBODIMENTS

Overview

Figure 1A:
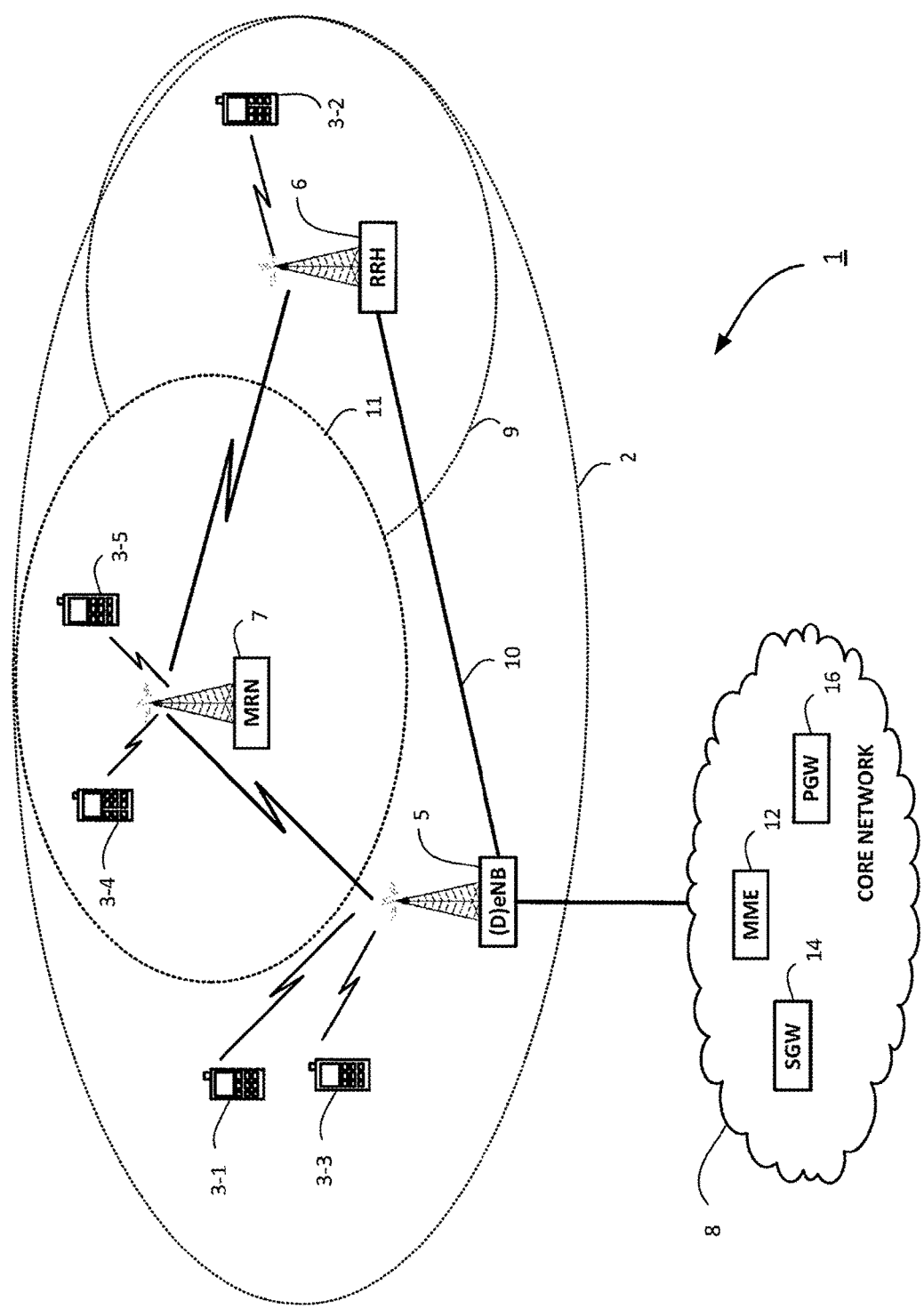
FIGS. 1a, 1b and 1c schematically illustrate different mobile telecommunication system scenarios having multiple network transmission points and a relay node.

FIG. 1a schematically illustrates a mobile (cellular) telecommunication system 1 including user equipment (UE) 3, comprising a plurality of mobile telephones 3-1 to 3-5, that are served in a macro cell 2 of a donor base station 5. The telecommunication system 1 also comprises a Remote Radio Head (RRH) 6, a relay node 7 and a core network 8. The RRH 6 is connected directly to the donor base station 5 by a high speed, high bandwidth communication link 10, such as an optical fiber link, through which the RRH 6 sends signals to and receives signals from the donor base station 5. Although one RRH 6 is shown in FIG. 1a, multiple may be provided if desired. The RRH 6 is controlled and synchronised by the donor base station 5 such that it transmits, over the air interface, signals to mobile telephones (in this case telephone 3-2) located within its cell 9 and receives signals back from those mobile telephones. In this exemplary embodiment, the RRH 6 is a low power transmitter such that it operates within the macro cell 2 of the donor base station 5; and the RRH cell 9 has the same cell ID as that of the macro cell 2. The relay node 7 connects wirelessly to the donor base station 5 via an RN-Un interface and operates its own relay cell 11 with a cell ID that is different to the cell ID of the macro cell 2. The donor base station 5 connects to the core network 8 via an S1 interface. The core network 8 comprises amongst other things, a mobility management entity (MME) 12, a serving gateway (SGW) 14 and a Packet Data Network (PDN) Gateway (PGW) 16.

Mobile telephones 3-1, 3-2 and 3-3 (hereafter referred to as Direct MTs) are each registered directly with the donor base station 5, and connect to it via a conventional Uu interface; albeit with mobile telephone 3-2 connecting to the donor base station 5 via the RRH 6. Mobile telephones 3-4 and 3-5 (hereafter referred to as Relay MTs) are each registered with the relay node 7, and connect to it via an RN-Uu interface. Accordingly, users of mobile telephones 3-1, 3-2 and 3-3 can communicate with other users via the donor base station 5 (and, in the case of mobile telephone 3-2, the RRH 6) and the core network 8. Users of mobile telephones 3-4 and 3-5 can communicate with other users via the relay node 7 and the donor base station 5 and the core network 8.

In this exemplary embodiment, the main differences between the RRH 6 and the relay node 7 include that the RRH 6 is connected to the donor base station by the high speed communication link 10 whilst the relay node 7 is connected via an air interface; and that the RRH 6 just acts like a remote antenna of the base station—such that the signals broadcast by the RRH 6 are the same as those broadcast by the donor base station 5; whereas the relay node 7 acts as a base station itself serving the Relay MTs 3-4 and 3-5 within the relay cell 11 that has a different cell ID to that of the macro cell 2. In other exemplary embodiments, however, the RRH 6 may use its own cell ID that is different from that of the macro cell 2.

As will be described in more detail below, one aspect of the invention is that the relay node 7 is able to communicate simultaneously with multiple transmission points—in the situation illustrated in FIG. 1a with different (widely separated) antennas of the same cell, i.e. with the donor base station 5 and the RRH 6.

Figure 1B:
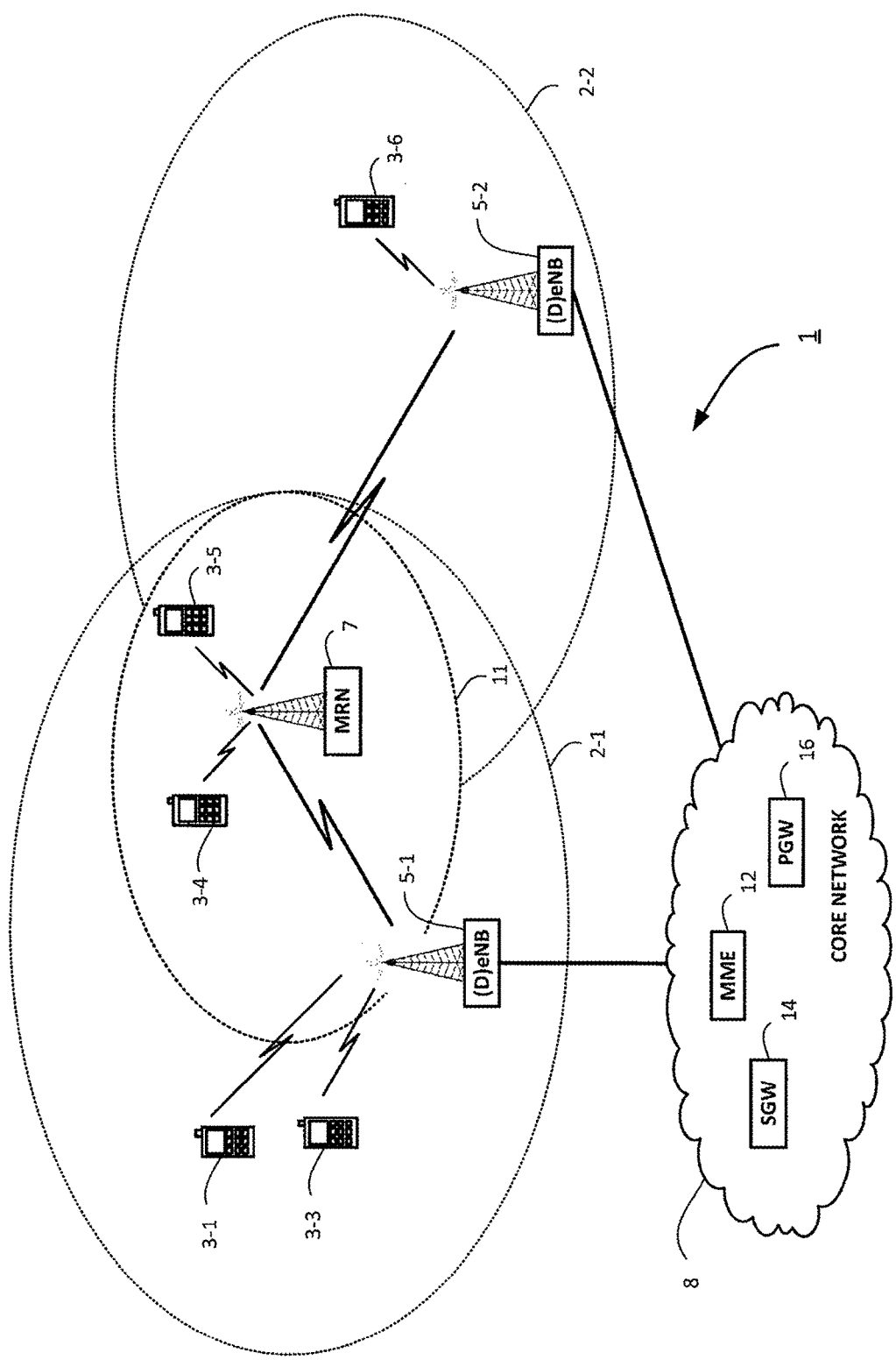
Figure 1C:
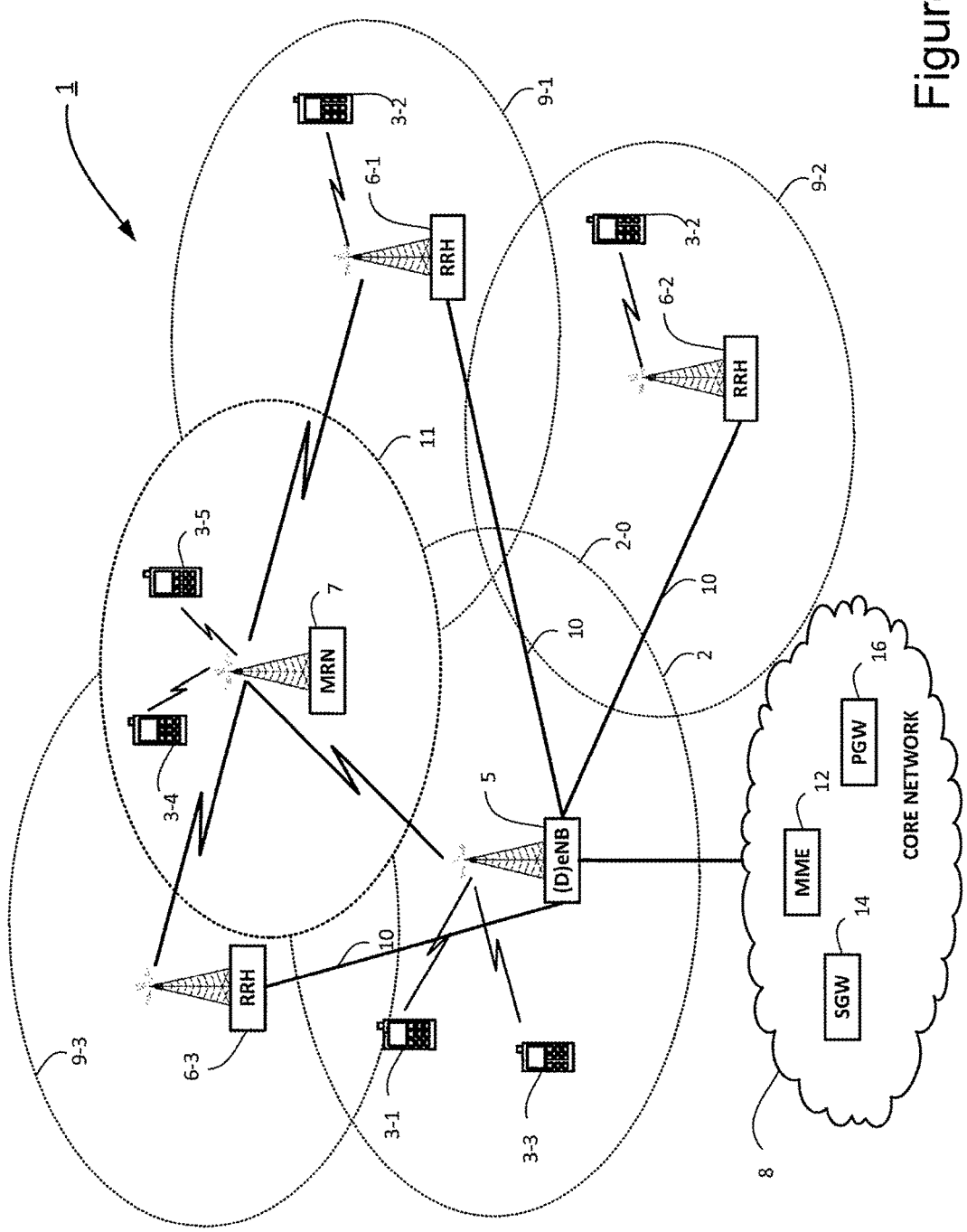

The invention also extends to other scenarios, such as where the transmission points are different cells belonging to different donor base stations. Such an embodiment is illustrated in FIG. 1b, which shows that the relay node 7 may be able to communicate with donor base station 5-1 within its donor cell 2-1 or with donor base station 5-2 within donor cell 2-2. FIG. 1c illustrates a further scenario in which the invention is applicable. In this case, the donor base station 5 controls three RRHs 6-1, 6-2 and 6-3 and each of these RRHs 6 operate their own RRH cell 9-1, 9-2 and 9-3 respectively, each having a different cell ID. In this exemplary embodiment, the RRHs 6 are high power transmitters that extend the range of the macro cell 2 of the donor base station 5. As shown in FIG. 1c, the relay node 7 is able to communicate simultaneously with the donor base station 5, with RRH 6-1 and with RRH 6-3.

LTE Sub-Frame Data Structure

Before discussing the specific ways in which the relay node 7 can communicate with the multiple transmission points, a brief description will be given of the access scheme and a general frame structure agreed for LTE communications. An Orthogonal Frequency Division Multiple Access (OFDMA) technique is used for the downlink to allow the Direct MTs (3-1, 3-2 and 3-3) and the relay node 7 to receive data over the air interface with the donor base station 5 and to allow the Relay MTs (3-3 and 3-4) to receive data over the air interface with the relay node 7. Different sub-carriers are allocated by the donor base station 5 (for a predetermined amount of time) to each Direct MT 3 and the relay node 7 depending on the amount of data to be sent to the mobile telephone 3 or the relay node 7. These are referred to as physical resource blocks (PRBs) in the LTE specifications. PRBs thus have a time and frequency dimension. Similarly, different subcarriers are allocated by the relay node 7 (for a predetermined amount of time) to each Relay MT, depending on the amount of data to be sent to the Relay MT. To do this, the donor base station 5 (and the relay node 7) dynamically allocates PRBs for each device that it is serving and signals the allocations for each sub-frame (TTI) to each of the scheduled devices in a control channel.

Figure 2A:
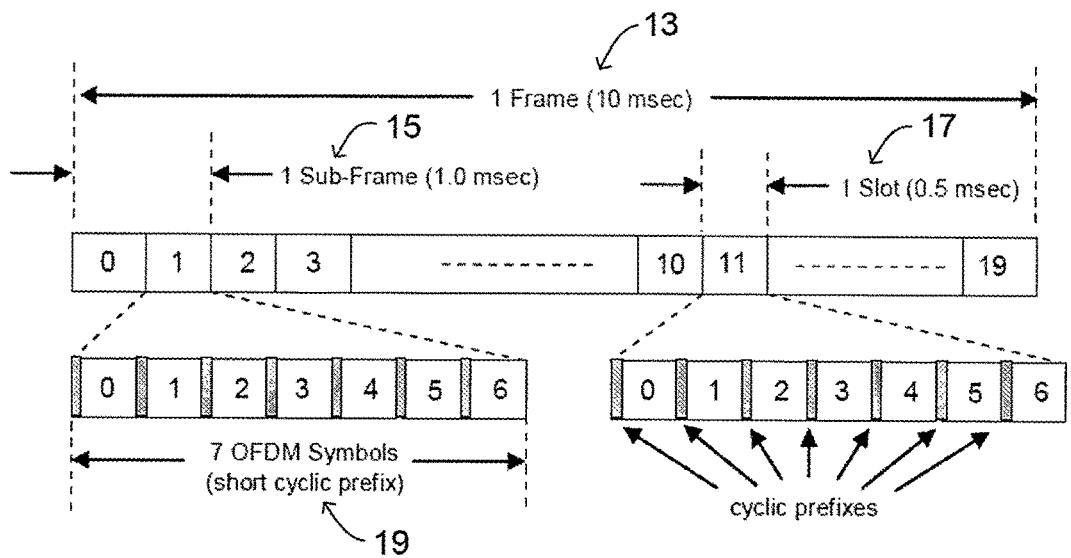
FIG. 2a illustrates a generic frame structure defined for use in the LTE communication network.
Figure 2B:
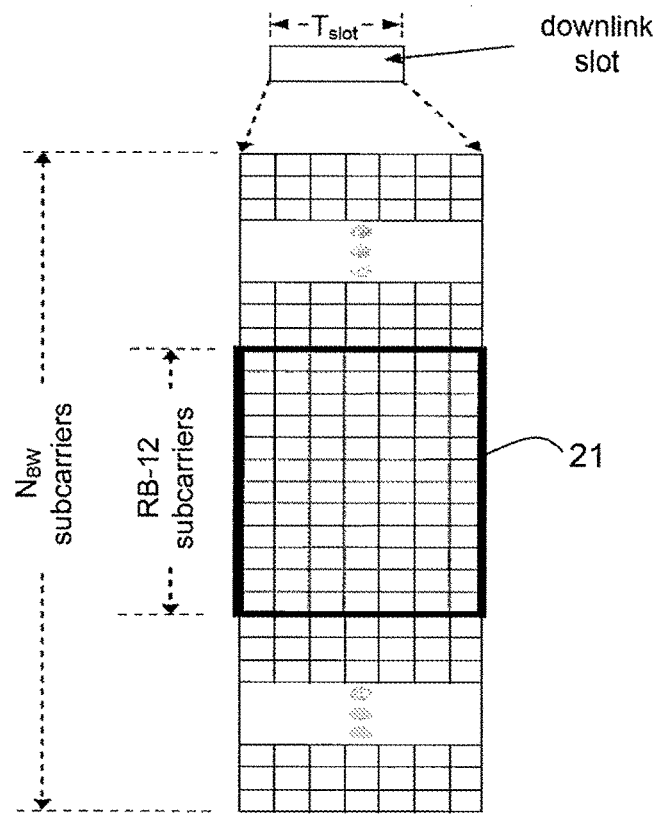
FIG. 2b illustrates the way in which a slot illustrated in FIG. 2a is formed of a number of time-frequency resources.

FIG. 2a illustrates one generic frame structure agreed for LTE communications over the air interface with the donor base station 5. As shown, one frame 13 is 10 msec long and comprises ten sub-frames 15 of 1 msec duration (known as a Transmission Time Interval (TTI)). Each sub-frame or TTI comprises two slots 17 of 0.5 msec duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). The transmitted downlink signal comprises $N_{BW}$ subcarriers for a duration of $N_{symb}$ OFDM symbols. It can be represented by a resource grid as illustrated in FIG. 2b. Each box in the grid represents a single sub-carrier for one symbol period and is referred to as a resource element. As shown in FIG. 2b, each PRB 21 is formed from 12 consecutive sub-carriers and (in this case) seven symbols for each subcarrier; although in practice the same allocations are made in the second slot 17 of each sub-frame 15 as well.

Multi-Point Transmission Modes

As discussed above, the relay node 7 is arranged, in this exemplary embodiment, to be able to communicate with a number of transmission points. This is preferably done using the techniques established for UEs to communicate with multiple transmission points—referred to as Coordinated Multi-Point (CoMP) transmission. These techniques are described in, for example, TR 36.819 V11.1.0, the contents of which are hereby incorporated by reference. The transmission points (TPs)—the donor base station(s) and the RRH(s) in the embodiments, co-operate together to co-ordinate the multi-point transmission with the relay node 7. Typically, different sets of co-ordinating transmission points will be provided within the communications system. A number of different multi-point transmission modes are possible, as follows:

1. Joint Transmission (JT). In this case the relay node 7 receives transmissions from multiple transmission points (TPs) on a time-frequency resource (such as on a PRB 21 on sub-frame n). These transmissions may be carrying the same data (such that the signals from each TP can be combined by the relay node 7 and thereby improve the quality of the received signal) or different data (such that more data per time-frequency resource is sent to the relay node 7) from the TPs.
2. Coordinated scheduling/beam forming (CS/CB). In this case the relay node 7 receives transmissions from only one TP on any one time-frequency resource 21, and the TPs co-ordinate their scheduling and/or beam forming decisions to minimise interference between the transmissions. The transmitting points that are used are chosen semi-statically—such that they change relatively infrequently.
3. Dynamic Point Selection (DPS). In this case the relay node 7 receives transmissions on a time-frequency resource from only one TP selected from the set of co-ordinating transmission points; but the selected TP may change rapidly (from one sub-frame 15 to another) based on the instantaneous radio channel conditions between the relay node 7 and the transmission points.

Advantages

Configuring the relay node 7 and the transmission points to operate in the above manner can offer a number of advantages, including:

1. Improving the reliability of the RN-Un physical channels (R-PDSCH (Relay-Physical Downlink Shared Channel), R-PDCCH (Relay-Physical Downlink Control Channel), etc). This applies in particular to R-PDCCH transmissions which are used to notify the relay node 7 of scheduled data transmissions and which (unlike R-PDSCH) do not benefit from HARQ (acknowledgements). Even though fixed relay nodes 7 are typically deployed in good radio coverage conditions, there could be situations in which the RN-Un link quality degrades. Transmitting the same data from more than one transmission point using joint transmission could, therefore, improve the reliability of R-PDSCH and R-PDCCH. The CS/CB and DPS techniques could also be beneficial in cases where interference on the RN-Un interface is high. These techniques could also be useful in the case where the relay node 7 is mobile and therefore moves relative to the transmission points.
2. Improving the data capacity of RN-Un, for example by transmitting different data for the relay node 7 from more than one donor base station 5. This may be particularly beneficial in the case of Type 1 RNs which, as noted above, have lower capacity than Type 1a/1b RNs due to their half-duplex operation.

Implementation

The inventors have identified that the techniques being developed to provide CoMP for UEs over the Uu interface cannot be directly applied to the RN-Un interface; and a number of changes are required, including:

1. Higher-layer (RRC) signalling is required between the donor base station 5 and the relay node 7 in order to configure the RN for multi-point transmission operation. This configuration may be performed in accordance with the following three main steps:
   a. The relay node 7 must be configured to make cell measurements of signals it receives from cells transmitting in its vicinity. These measurements include RRM measurements (based on a Common Reference Signal (CRS)) or CSI-RS (Channel State Information-Reference Signals) based measurements or a combination of both; which measure signal properties of signals received by the relay node 7 and which were transmitted by different base stations or different base station cells. As the donor base station may ask the relay node to perform either type of measurement, the relay nodes will have to be configured so that they can perform either type of measurement. At present, relay nodes 7 that are fixed are not allowed to perform inter cell mobility (i.e. handover from one donor cell to another) and so, at present, there is no need to configure fixed relay nodes to perform such signal measurements. Mobile relay nodes are already configured to perform CRS measurements, but they will need to be configured to perform CSI-RS based measurements as well.
   b. At present, because fixed relay nodes are not allowed to perform inter cell mobility, they are not configured to make measurements, nor are they configured to report signal measurements back to the serving donor base station 5. So in addition to configuring the relay node 7 to perform the desired signal measurements, the relay node must also be configured to report those signal measurements back to the donor base station 5. The donor base station 5 can then use the measurement reports to determine which transmission points are within range of the relay node 7 and therefore which transmission points can be selected for simultaneous transmissions to the relay node 7.
   c. The RRC signalling defined in LTE Rel 10 for relay nodes 7 involves the configuration/reconfiguration (by the donor base station 5) of the R-PDCCH (Relay-Physical Downlink Common Control Channel) and the MBSFN sub-frame configuration. In the present scenario with multiple transmission points, the resources used by each transmission point for the R-PDCCH and the MBSFN sub-frame structure must be coordinated between the donor base stations in the coordinating set of TPs. This may, for example, be controlled by one 'master' donor base station 5. In particular, once the master donor base station 5 has determined what resources each transmission point should use, it will send configuration data for the R-PDCCH and for the MBSFN sub-frame structure to each transmission point over the X2 interface. The configuration for each transmission point may be the same or different to the configuration of the master donor base station 5. For example, the resources used for R-PDCCH may be preconfigured using RRC signalling in a semi-static manner so that the same resources in the multiple transmission points are used. In this case, the transmitting points will rely on the selected multi-point transmission scheme e.g. DPS/JT/CS/CB to provide reliable reception at the relay node 7. Alternatively, the master donor base station 5 may configure the coordinating transmission points to use different time-frequency resources for R-PDCCH (using the same or different Modulation Coding Schemes (MCS) for the R-PDCCH/R-PDSCH from different TPs). This approach can, for example, increase the throughput on R-PDSCH by allowing the TPs to schedule for different data transmissions using multiple R-PDCCHs using different time-frequency resources. Alternatively, this approach can be used to provide reliability by using different TPs to schedule the same set of time-frequency resources for the R-PDCCH search space.

Figure 3A:
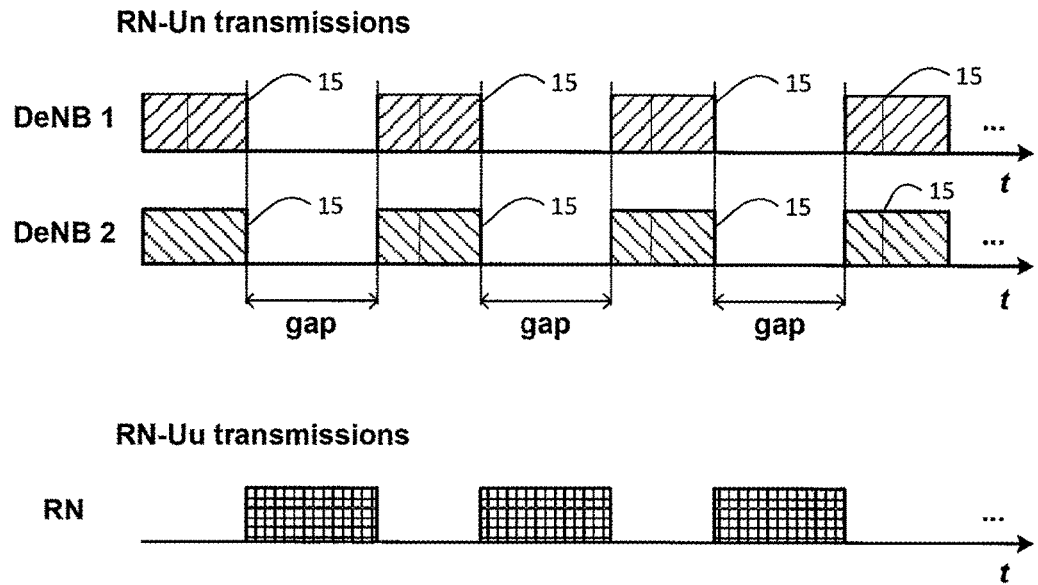
FIGS. 3a and 3b illustrate the way in which sub-frame transmissions may be arranged between donor base stations of a coordinated set of transmission points.
Figure 3B:
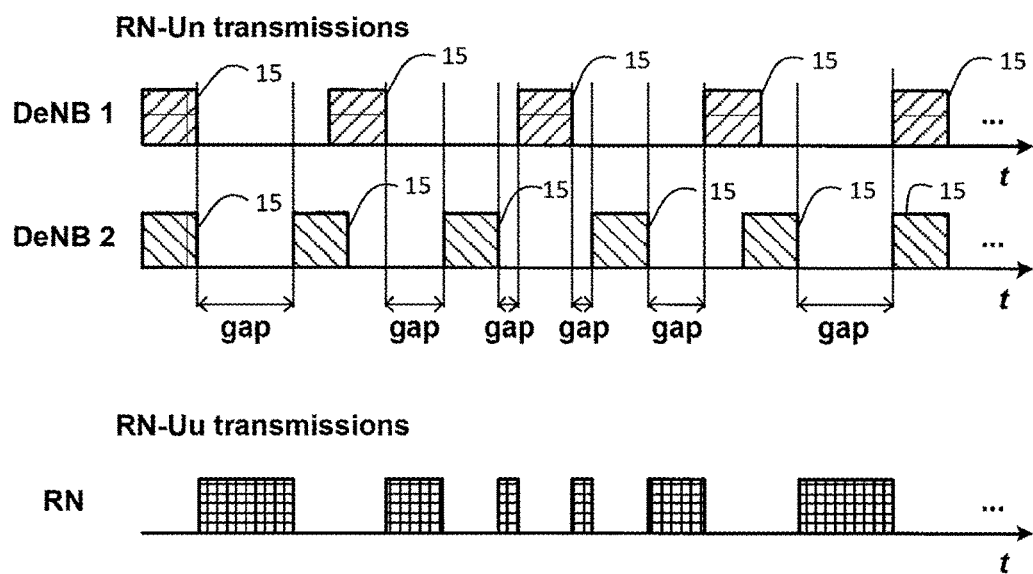

2. In the case of Joint Transmission (with either the same or different data) applied to Type 1 RNs, coordination of RN-Un sub-frame assignments between the different donor base stations is necessary so that the relay node 7 can receive data from the multiple donor base stations 5 at the same time. More specifically, in view of the "half duplex" nature of the RN-Un interface and the RN-Uu interface, there will be gaps between the sub-frames 15 assigned for transmission over the RN-Un interface during which gaps, sub-frames 15 can be assigned by the relay node 7 for transmissions over the RN-Uu interface. The half duplex nature of the RN-Un and RN-Uu interfaces is illustrated in FIGS. 3a and 3b. The donor base stations 5 are free to determine the "pattern" of such RN-Un sub-frame assignments. The patterns of sub-frame assignments made by the donor base stations 5 within the coordinating set of transmission points may be the same (as they are in FIG. 3a), or they may be different (as they are in FIG. 3b). If they are different, then the sub-frame patterns must at least overlap in time so that there are some sub-frames 15 transmitted by the multiple coordinating donor base stations 5 in which the relay node 7 can receive transmissions from those donor base stations 5. This requires each coordinating donor base station 5 to exchange information to allow them each to define a pattern of RN-Un sub-frame assignments that will allow the relay node 7 to communicate with the multiple donor base stations 5 at the same time. In the preferred exemplary embodiment, this information exchange is performed over the X2 interface with the neighbouring base stations. This information exchange preferably happens when the set of coordinating donor base stations 5 is established for the relay node 7 (or each relay node 7 if there are multiple relay nodes), although the pattern of sub-frame assignments made by one or more of the coordinating donor base stations 5 may change over time (for example to accommodate changing rates of data throughput for the relay node 7) and further information exchanges between the donor base stations 5 may be required to accommodate such changes.

3. As discussed in the introduction, LTE Rel-10 allows donor base stations 5 to appear as the MME 12 to the relay node 7 due to a proxy function inside the donor base station 5. This results in a single signalling connection between the MME 12 and the relay node 7, via the proxy donor base station 5. However, if the relay node 7 connects to multiple donor base stations 5, then changes are needed either to the MME 12 or to the donor base stations 5. In particular, in order to allow the relay node 7 to be able to communicate with multiple donor base stations 5, either one of the donor base stations 5 (referred to as the 'master' donor base station) provides the normal proxy functions to the MME, SGW etc whilst the others do not or the MME/SGW etc are modified so that multiple signalling connections are provided between them and the relay node through each of the coordinating donor base stations 5. Each of these possibilities will be considered in more detail below.

4. Additional signalling is required between the donor base stations 5 in the coordinating set of TPs. This signalling will typically be performed over the X2 interface that connects neighbouring base stations together. This additional X2 signalling will include:

a. signalling to inform the other donor base stations that they are serving a relay node 7. In particular, the interface between the donor base station 5 and a UE 3 or between the donor base station 5 and the relay node 7 can have up to 8 bearers (each UE bearer normally being used to carry a different data stream for the UE—for example one bearer may be used to carry VoIP data, whilst another carries FTP or browser data etc). In the case of a relay node 7, since it is serving multiple UEs 3 and each of those UEs 3 can have up to 8 bearers, the donor base station 5 has to map bearers on the Uu interface to (higher bandwidth) bearers on the RN-Un interface. The donor base stations 5 in the coordinating set of TPs must be aware that they will be serving a relay node 7 so that resource allocation for such high bandwidth bearers can be reserved accordingly. If a master donor base station is provided, then typically it will be the master donor base station 5 that will signal this information to the other donor base stations 5 over the X2 interface using, for example, the X2 eNB configuration update message or the eNB resource status information message etc., or using a new message dedicated to provide this information.

b. (if a single master donor base station is provided) signalling of transmission point system information via the master donor base station 5. In particular, the relay node 7 does not read system information for PWS (Public Warning System) related information (SIB 10, 11 and 12). Instead the relay node 7 receives this information over the S1 interface from the core network 8 using the S1:Write/Replace messages. Therefore, if there is a master donor base station 5, then it will receive the system information from the core network 8 and, if it is not itself scheduled to transmit data to the relay node 7 (perhaps because of interference), then it has to signal this system information over the X2 interface to the other transmission points so that the information can be transmitted to the relay node 7.

Master Donor Base Station

Figure 4A:
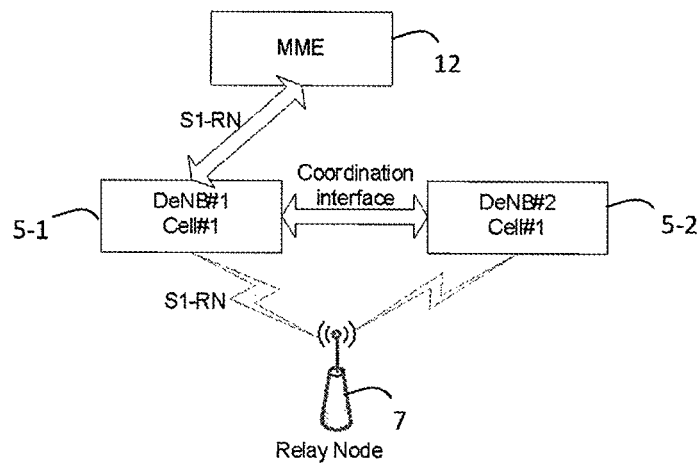
FIGS. 4a, 4b, 4c and 4d illustrate different options for providing S1 proxy functions for a relay node configured for multi-point transmission.

In the case where a single master donor base station is allowed to provide the proxy function then no changes need to be made to the network nodes (MME, SGW etc.). In this case, referring to FIG. 4a, the master donor base station 5-1 would provide the proxy function for the relay node 7 so that signalling from the network node (in this case the MME 12) pass to the master donor base station 5-1 before being transmitted to the relay node 7 either by the master donor base station 5-1 or by the other donor base station 5-2 or by both the master and the other donor base stations 5 (depending on the multi-point communications mode that is being used over the RN-Un interface). If the signalling has to be routed to one or more of the other donor base stations 5-2, then the master donor base station 5-1 will transmit the signalling to the other donor base station(s) 5-2 via the X2 interface that it has with those other donor base stations 5-2.

Figure 4D:
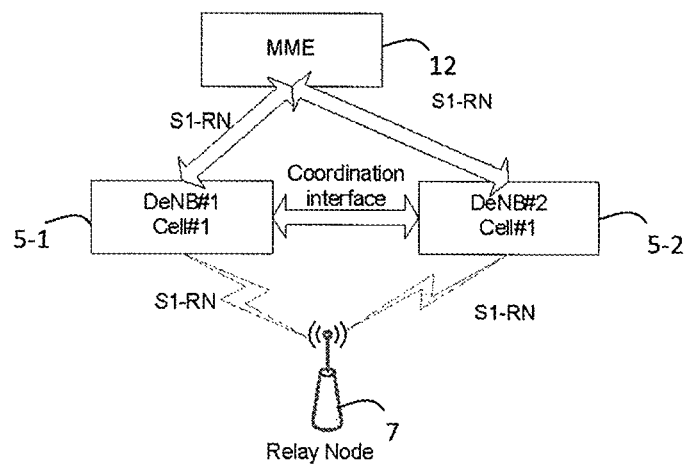
Figure 4B:
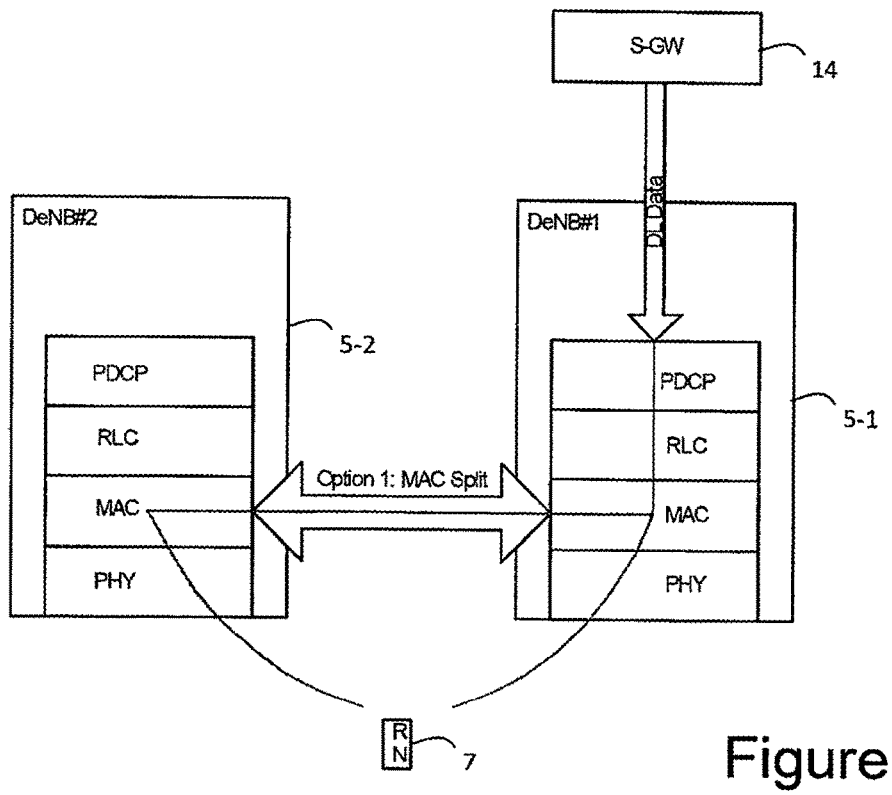

The signalling information forwarded to the other donor base station 5-2 may be performed at the MAC layer, such that the X2 PDUs are MAC PDUs. This is illustrated in FIG. 4b. In this case, security is performed at the PDCP layer of the master donor base station 5-1 and RLC retransmissions are handled by the RLC layer of the master donor base station 5-1. Scheduler scaling is required because, for example, PDCP/RLC capacity should be less than scheduler capacity. In particular, if the PDCP and RLC layers support user traffic of 1 GB per second then the scheduler must be able to support 1 GB per second+X, where X depends on the traffic coming from other network nodes. This is similarly true in respect of data traffic in the reverse direction.

Figure 4C:
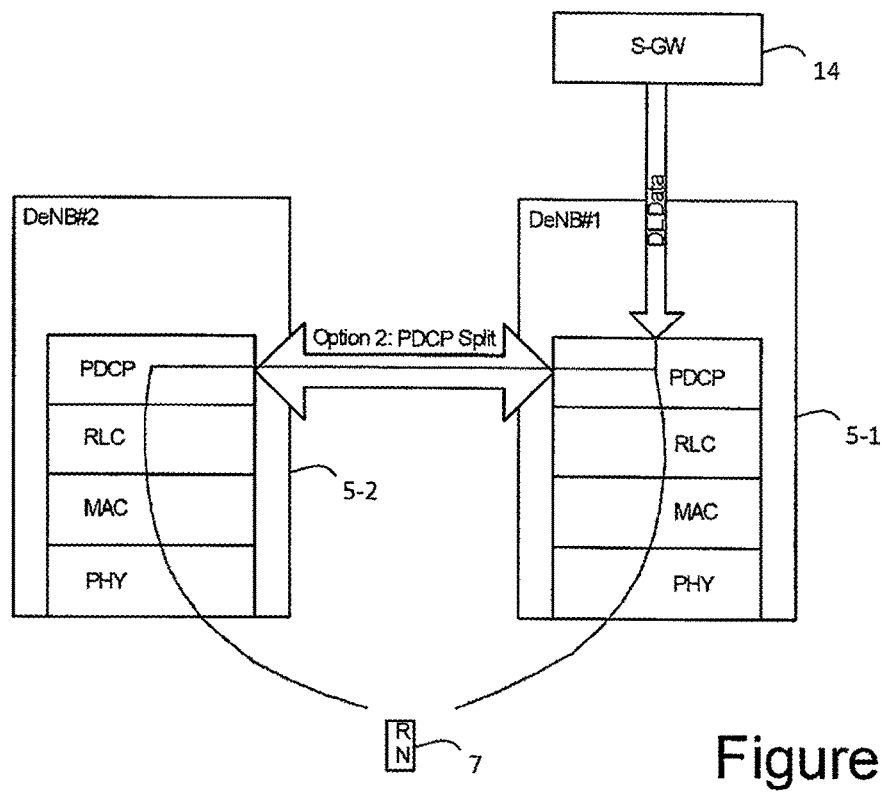

Alternatively, the signalling information forwarded to the other donor base station 5-2 may be performed at the PDCP layer, such that the X2 PDUs are PDCP PDUs. This is illustrated in FIG. 4c. In this case RLC retransmissions would be handled by the other donor base station 5-2 (not the master), which reduces the signalling required over the X2 interface. However, this arrangement is not preferred as it introduces complexities in terms of how to co-ordinate security handling and selection of the Modulation and Coding Scheme (MCS) for cases where the same data is to be sent from multiple TPs over the physical Un interface.

Which one of the donor base stations within the set of coordinating transmission points is the master donor base station 5-1 may be defined in advance, for example when the set of coordinating transmission points for the relay node 7 is first established. Alternatively, the master donor base station 5-1 may be defined at the time that the relay node 7 is initially configured for multi-point transmission operation—in which case, the original donor base station 5 to which the relay node 7 first connects may be set as the master donor base station 5-1 for that relay node 7. Alternatively, a new master donor base station 5-1 may be defined for the relay node 7 during the configuration process. Where there are multiple relay nodes 7, the same or different master donor base stations 5-1 may be assigned to them. Regardless of how the master donor base station 5-1 is defined, the other donor base stations 5-2 will have to be informed that they are not the master donor base station so that they can modify their normal operation so that they do not provide the normal proxy functions for the relay node 7. These other donor base stations 5-2 may be informed that they are not the master donor base station, either by the master donor base station 5-1 or by a node in the core network (such as the MME 12 or by an Operations & Management entity (not shown)).

Modified Network Node

As discussed above, instead of assigning a master donor base station, 5-1 that provides a proxy function for the network node to the relay node 7, the network node itself may be modified to allow multiple signalling connections to the same relay node 7. This would then allow all (or a subset) of the donor base stations 5 to provide their normal proxy functions to the relay node 7. Such an arrangement is illustrated in FIG. 4d, which shows the network node (in this case the MME 12) having established signalling channels with the relay node 7 via both donor base stations 5-1 and 5-2.

Normally the S1/X2 signalling connection for the relay node 7 is established when the relay node 7 is powered up, but the relay node 7 may be configured for coordinated multi-point transmission later during its normal operation and not necessarily when it is powered up. For example, the donor base station 5-1 may decide to provide more bandwidth to the relay node 7 and configure the relay node 7 to perform CRS and/or CSI-RS measurements. In response the relay node 7 will perform the measurements and report the results back to the donor base station 5-1. The donor base station 5-1 then processes the measurements to identify other transmission points (which may include other cells of the same donor base station 5-1 or cells of other donor base stations 5-2) that are within range of the relay node 7 and which can be included in the coordinating set of transmission points. Once configured for multipoint transmission, the relay node 7 can then initiate S1/X2 signalling through each donor base station 5-1 and 5-2. In this case, at the time that the relay node 7 is being configured for coordinated multi-point transmission, the network node would be informed so that the network node knows what to do when it receives the additional signalling through the other donor base stations in the coordinating set of transmission points.

Relay Node

Figure 5:
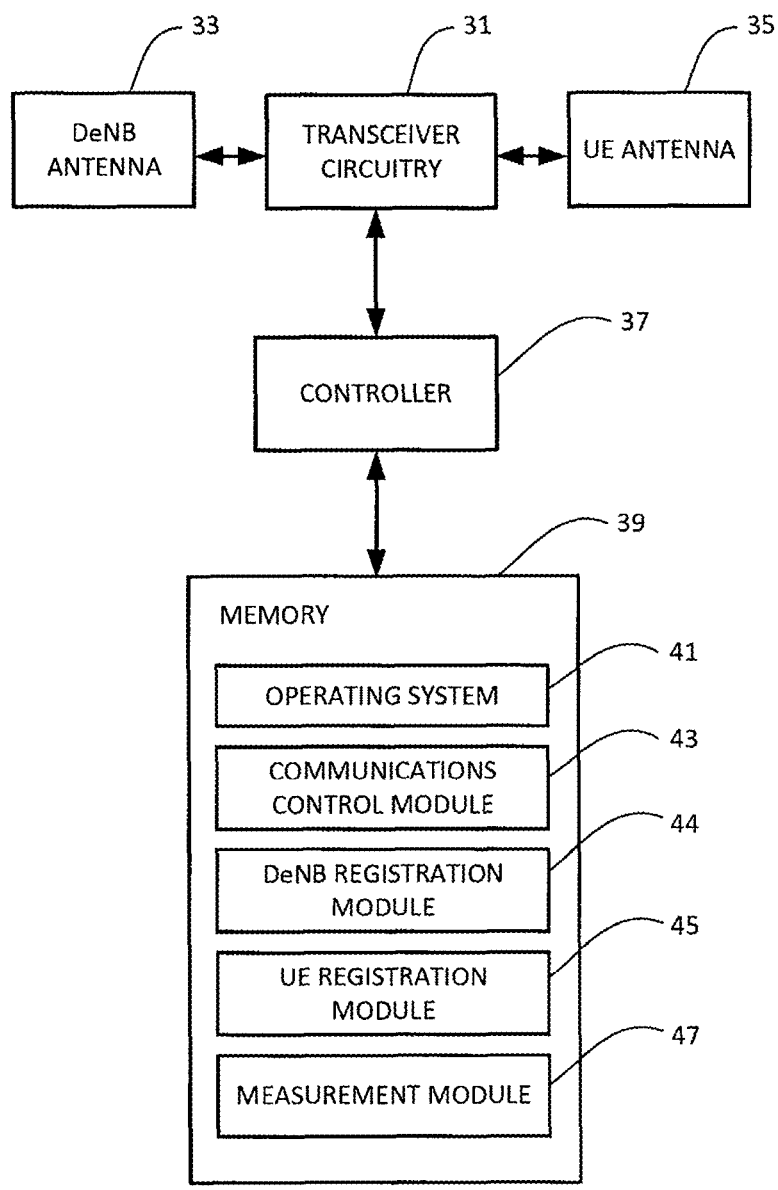
FIG. 5 is a block diagram illustrating the main components of the relay node forming part of the system shown in FIG. 1.

FIG. 5 is a block diagram illustrating the main components of the relay node 7 used in the above exemplary embodiments. The relay node 7 may be a fixed relay node or a mobile relay node. As shown, the relay node 7 includes transceiver circuitry 31 which is operable to transmit signals to, and to receive signals from, the (or each) donor base station 5 via base station antenna 33 and the user equipment 3 via the UE antenna 35. (In some embodiments a single antenna is used.) The operation of the transceiver circuitry 31 is controlled by a controller 37 in accordance with software stored in memory 39. The software includes, among other things, an operating system 41, a communications control module 43, a donor base station registration module 44, a user equipment registration module 45 and a measurement module 47.

The communications control module 43 is operable to control communication with the user equipment 3 and the (or each) donor base station 5 including, for example, allocation of resources to be used by the transceiver circuitry 31 in its communications with each of the user equipment 3 and with the (or each) donor base station 5. The communications control module 43 also controls handover of the relay node 7 to another donor base station if the relay node 7 is a mobile relay node. More specifically, the communications control module 43 is operable to configure the relay node 7 either for single point communication (in which the relay node 7 sends and receives data to be relayed to and from a single transmission point (donor base station 5)) or for multi-point communication (in which the relay node 7 sends and receives data to be relayed to and from multiple transmission points (such as multiple donor base stations 5), depending on configuration information received from the currently serving donor base station 5. If operating in the multi-point communication mode, then the configuration information will also define which multi-transmission point communication mode to use—JT, CS/SB or DPS. For example, in the case of JT with the same data being transmitted by multiple donor base stations, the communications control module 43 configures the transceiver circuitry 31 so that signals received using the same time-frequency resource are combined together to increase the reliability of the data communication. If different data is being transmitted by multiple transmission points, then the communications control module 43 configures the transceiver circuitry 31 by defining which time-frequency resources carry the different data streams (determined from the scheduling assignments defined in the received R-PD-CCHs)—so that the different data can be separately received.

The donor base station registration module 44 is operable to perform registration of the relay node 7 with a donor base station 5, for example, during start up or handover of the relay node 7 or when the relay node is being configured for coordinated multi-point communication. The user equipment registration module 45 is operable to keep track of user equipment 3 served by the cell(s) 11 of the relay node 7.

The measurement module 47 is operable to make signal measurements of signals received from different cells. This information may be used by the relay node 7 to request reconfiguration to communicate with multiple transmission points or may be reported back to the donor base station(s) 5 to control which transmission points will carry the relay data in the next sub-frame 15 (when operating using the DPS communication mode discussed above). Alternatively or in addition, the measurement module 47 may be requested to start making the measurements by the donor base station 5 and to report the signal measurements back to the donor base station for use in defining the transmission points to be used in the coordinating set of TPs for that relay node 7. The measurement module 47 may continue making and reporting the signal measurements back to the donor base station 5 for use in coordinating the multi-point transmissions or for controlling handover of the relay node 7 to another part of the core network 8; or it may stop performing the signal measurements after it has reported the measurements back to the donor base station 5.

Donor Base Station

Figure 6:
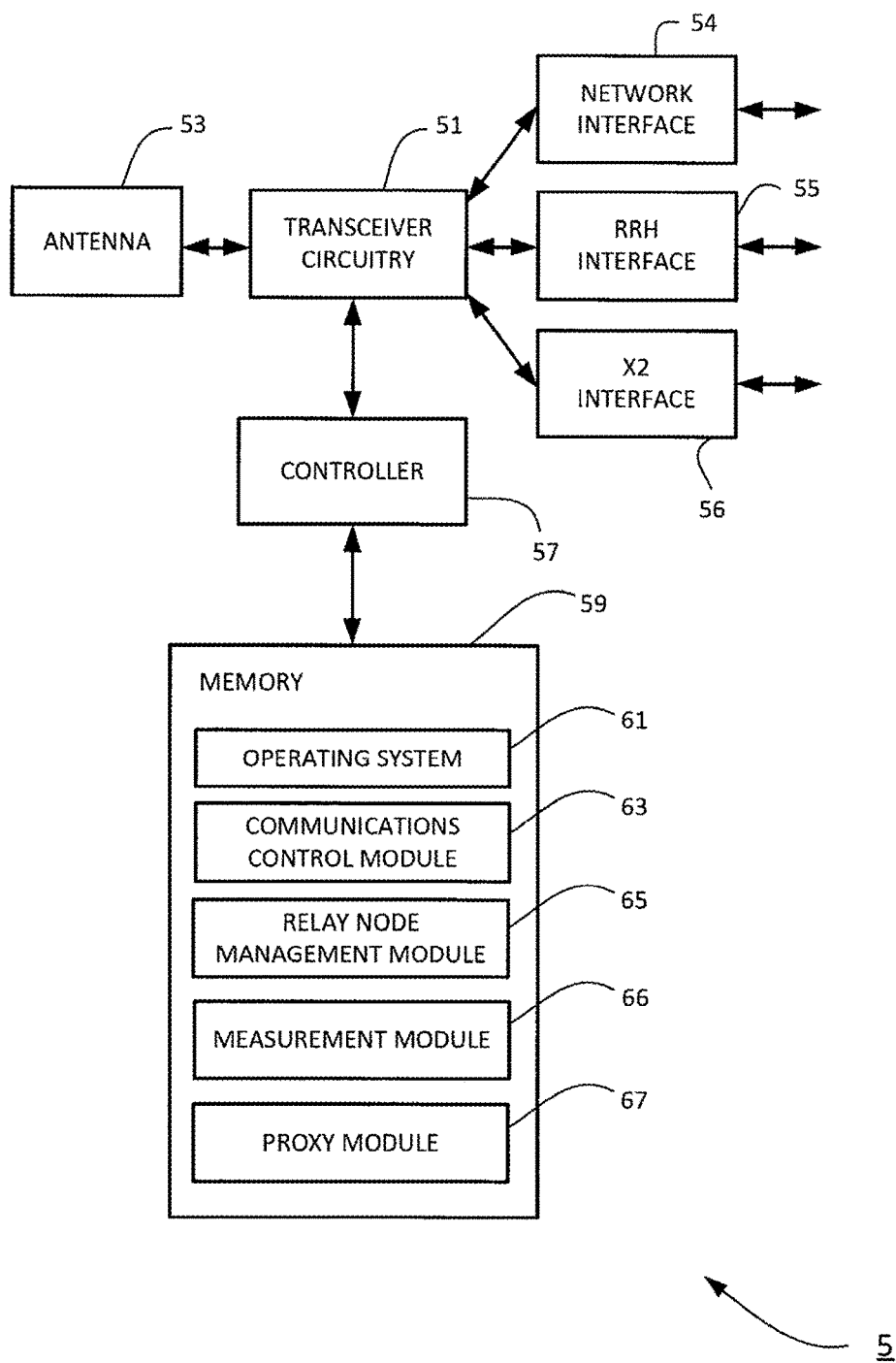
FIG. 6 is a block diagram illustrating the main components of the donor base station forming part of the system shown in FIG. 1.

FIG. 6 is a block diagram illustrating the main components of one of the donor base stations 5 shown in FIG. 1. As shown, the donor base station 5 includes transceiver circuitry 51 which is operable to transmit signals to, and to receive signals from, the relay node 7 via at least one antenna 53. The donor base station 5 is also operable to transmit signals to and to receive signals from nodes in the core network 8, such as the MME 12, the SGW 14 or the PGW 16 via a network interface 54; to transmit signals to and to receive signals from the RRH 6 via an RRH interface 55; and to transmit signals to and to receive signals from other base stations 5 via an X2 interface 56. The operation of the transceiver circuitry 51 is controlled by a controller 57 in accordance with software stored in memory 59. The software includes, among other things, an operating system 61, a communications control module 63, a relay node management module 65, a measurement module 66 and a proxy module 67.

The communications control module 63 is operable to control communications between the base station and the relay node 7, user equipment 3, and the network devices such as the RRH 6, the MME 12, the SGW 14 and the PGW 16. The communications control module 63 is operable to send the relay node 7 configuration data that controls the configuration of the relay node 7 to operate either in a conventional single point transmission state (in which the relay node 7 will send and receive data to be relayed only to or from the one donor base station) or in a multi-point transmission state (in which the relay node 7 will send and receive data to be relayed to or from plural transmission points). The communications control module 63 is also operable to coordinate (with the other transmission points) which transmission points will be in the set of coordinating transmission points for the relay node—based on the signal measurements received from the relay node 7. The communications control module 63 also coordinates the multi-point transmissions to be made to a relay node 7 with the other transmission points in the coordinating set of transmission points (e.g. other donor base stations 5, the RRHs connected to the donor base station 5 and other cells operated by the donor base station 5). This will involve sharing of patterns of sub-frame assignments for the relay node 7 over the X2 interface 56, the sharing of position information for controlling beam forming techniques used to reduce interference and, where DPS is used, may involve the sharing of signal measurements reported by the relay node 7. Based on the coordinated sharing of information the downlink data for the relay node 7 can be mapped onto appropriate time-frequency resources and transmitted by the different transmission points in the coordinating set.

The relay node management module 65 is operable to control the connection between the donor base station 5 and the relay node 7 attached thereto and in particular to control assignment of time/frequency resources used to carry data over the RN-Un interface.

The measurement module 66 is operable to control the relay node 7 to cause it to perform and report desired signal measurements (for example CRS or CSI-RS measurements) and to pass the relevant signal measurements received back from the relay node 7 to the communications control module 63.

The proxy module 67 is operable to provide the above described proxy functions for the relay node 7 and, if informed by another donor base station that the other donor base station is a master donor base station for the relay node 7, to inhibit the operation of the proxy functions for that relay node 7. The proxy module 67 will typically maintain a table of data that identifies, for each relay node 7 served by the donor base station, information that defines if the donor base station 5 is a master for that relay station 7 or if another donor base station is a master for that relay node 7 and perhaps information defining if no master has been assigned to the relay node 7—although this may just be the default setting.

Network Node

Figure 7:
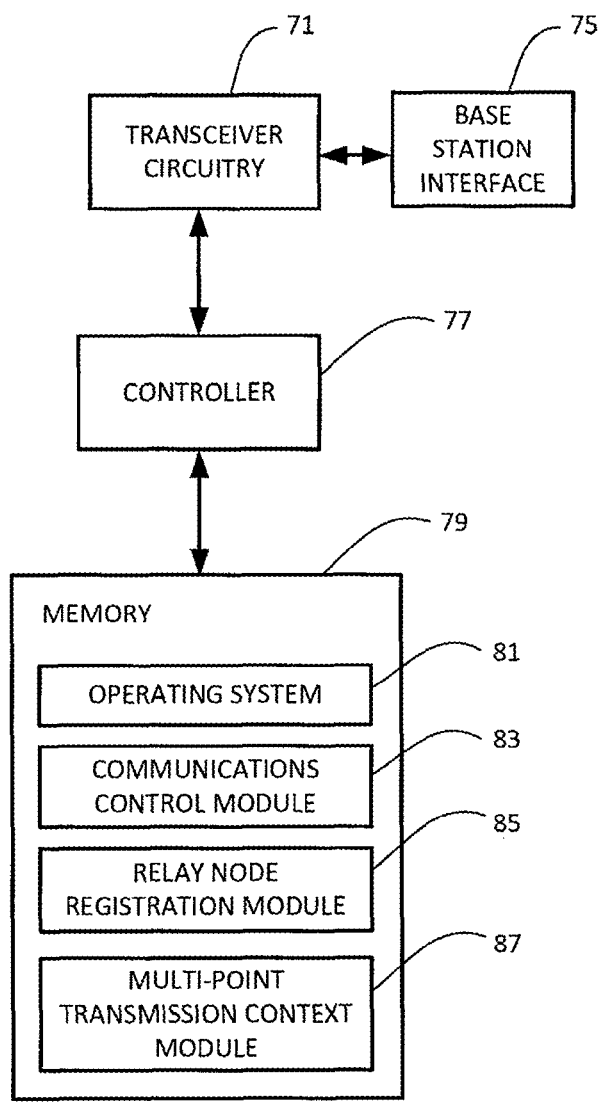
FIG. 7 is a block diagram illustrating the main components of a network node forming part of the system shown in FIG. 1.

FIG. 7 is a block diagram illustrating the main components of a network node for which the donor base station 5 would normally provide a proxy function—such as the MME 12, the SGW 14, the PGW 16. As shown, the network node includes transceiver circuitry 71 which is operable to transmit signals to, and to receive signals from the donor base station via the base station interface 75. The operation of the transceiver circuitry 71 is controlled by a controller 77 in accordance with software stored in memory 79. The software includes, among other things, an operating system 81, a communications control module 83, a relay node registration module 85 and a multi-point transmission context module 87.

The communications control module 83 is operable to control the communication with the donor base stations 5 and the relay nodes 7.

The relay node registration module 85 is operable to store and maintain a list of relay nodes 7 connected to the core network 7.

The multi-point transmission context module 87 is operable to maintain context information for each relay node 7 that identifies the donor base station(s) through which the relay node 7 connects to the core network 8. If a relay node 7 connects to the core network through more than one donor base station, then the multi-point transmission context module 87 maintains information defining if multiple S1 interfaces are provided to the relay node 7 through the plural donor base stations 5.

In the above description, the mobile relay node 7, the donor base station 5, and the network node are described for ease of understanding as having a number of discrete modules (such as the communications control modules and the registration modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Modifications and Alternatives

Detailed embodiments have been described above. As those skilled in the art will appreciate, a number of modifications and alternatives can be made to the above exemplary embodiments whilst still benefiting from the inventions embodied therein.

In the above exemplary embodiments, a single relay node was described, however, it will be appreciated that typically there will be many relay nodes provided in a deployed system.

In the above exemplary embodiments, the donor base stations 5 operated one cell. As is well known in the art, each base station may operate a number of cells, each of which may be a transmission point within the coordinated set of transmission points.

In some of the above exemplary embodiments, a master donor base station was assigned amongst the donor base stations serving a relay node. That single master donor base station provided the conventional proxy functions for other network nodes, such as the MME. In an alternative exemplary embodiment, different donor base stations may be configured to provide different ones of the proxy functions to the relay node. For example, one donor base station may provide the proxy function for the MME whilst another donor base station may provide the proxy function for the SGW. However, such an arrangement is not preferred as it will increase system complexity.

In the above exemplary embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the exemplary embodiments described above, the relay node and the base stations will each include transceiver circuitry. Typically this circuitry will be formed by dedicated hardware circuits. However, in some exemplary embodiments, part of the transceiver circuitry may be implemented as software run by the corresponding controller.

In the above exemplary embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from United Kingdom Patent Application No. 1212440.0, filed on Jul. 12, 2012, the disclosure of which is incorporated herein in its entirety by reference.

The invention claimed is:

1. A mobile relay node configured to relay received data to one or more communications devices served by the mobile relay node, the mobile relay node comprising:
   transceiver circuitry configured to transmit signals to and configured to receive signals from one or more remote transmission points via an air interface and the one or more communications devices served by the mobile relay node via an RN-Uu interface; and
   communications control circuitry configured to control the operation of the mobile relay node such that in a first operating state the mobile relay node is configured to receive data to be relayed from a remote transmission point and such that in a second operating state the mobile relay node is configured to simultaneously receive data to be relayed from a plurality of remote and separate transmission points,
   wherein the communications control circuitry is configured to receive, from a remote transmission point, configuration data that controls configuration of the mobile relay node and that defines whether the communications control circuitry is to operate in said first operating state or said second operating state,
   wherein the communications control circuitry is configured to operate the mobile relay node either for the first operating state or for the second operating state, depending on the configuration data.

2. A mobile relay node according to claim 1, further comprising measurement circuitry configured to signals transmitted by different transmission points within the vicinity of the mobile relay node.

3. A mobile relay node according to claim 2, wherein the measurement circuitry is configured to perform said measurements and to report the measurements to a remote transmission point in response to receiving a request to perform the measurements from the remote transmission point.

4. A donor base station for use in communicating with one or more mobile relay nodes via an RN-Un interface, the donor base station comprising:
   transceiver circuitry configured to transmit signals to and to receive signals from the mobile relay node; and
   communications control circuitry configured to transmit configuration data that controls configuration of the mobile relay node to the mobile relay node to configure the mobile relay node to operate in a first operating state in which the mobile relay node will receive data to be relayed from the donor base station or to operate in a second operating state in which the mobile relay station node simultaneously receives data to be relayed from a plurality of remote and separate transmission points.

5. A donor base station according to claim 4, further comprising measurement circuitry configured to transmit a request to the mobile relay node to perform signal measurements of signals transmitted by other transmission points within the vicinity of the mobile relay node and configured to receive measurement results back from the mobile relay node.

6. A donor base station according to claim 5, wherein the communications control circuitry is configured to determine which transmission points the mobile relay node should communicate with in said second operating state based on the signal measurements received from the mobile relay node.

7. A donor base station according to claim 4, wherein the communications control circuitry is configured to exchange information with other base stations over a base station interface to coordinate transmissions to the mobile relay node when operating in said second operating state.

8. A donor base station according to claim 7, wherein the donor base station is configured to exchange one or more of the following over the base station interface: i) patterns of sub-frame assignments made by the different transmission points for the mobile relay node; ii) position information for controlling beam forming techniques used to reduce interference; iii) signal measurements reported by the mobile relay node; iv) signalling to inform another base stations that they are serving the mobile relay node so that the other base station can reserve appropriate resources for the mobile relay node; v) signalling of system information for Public Warning System related information; and vi) information to coordinate resources used by each base station for R-PDCCH and MBSFN sub-frame structure.

9. A method performed by a mobile relay node that relays received data to one or more communications devices served by the mobile relay node via an RN-Uu interface, the method comprising:
transmitting signals to and receiving signals from one or more remote transmission points via an air interface and the one or more communications devices served by the mobile relay node via the RN-Uu interface;
receiving configuration data that controls configuration of the mobile relay node from a remote transmission point that sets the mobile relay node in a first operating state in which the mobile relay node receives data to be relayed from a remote transmission point, or in a second operating state in which the mobile relay node simultaneously receives data to be relayed from a plurality of remote and separate transmission points; and
operating the mobile relay node either for the first operating state or for the second operating state, depending on the configuration data.

10. A method according to claim 9, further comprising obtaining signal measurements of signals transmitted by different transmission points within the vicinity of the mobile relay node.

11. A method according to claim 10, further comprising reporting the measurements to a remote transmission point in response to receiving a request to perform the measurements from the remote transmission point.

12. A method according to claim 9, wherein the second operating state comprises plural communications modes including one or more selected from the group comprising: i) joint transmission mode in which multiple transmission points send data to the mobile relay node; ii) Coordinated Scheduling/Beam forming (CS/CB) mode in which the mobile relay node receives transmissions from one transmission point, and the transmission points co-ordinate their scheduling and/or beam forming decisions to minimise interference between the transmissions; and iii) Dynamic Point Selection (DPS) mode in which the mobile relay node receives transmissions from a transmission point selected from a set of co-ordinating transmission points.

13. A method performed by a donor base station that communicates with one or more mobile relay nodes via an RN-Un interface, the method being characterised by transmitting configuration data that controls configuration of the mobile relay node to the mobile relay node to configure the mobile relay node to operate in a first operating state in which the mobile relay node receives data to be relayed from a remote transmission point, or in a second operating state in which the mobile relay node simultaneously receives data to be relayed from a plurality of remote and separate transmission points.

14. A method according to claim 13, further comprising transmitting a request to the mobile relay node to perform signal measurements of signals transmitted by other transmission points within the vicinity of the mobile relay node and receiving measurement results from the mobile relay node.

15. A method according to claim 14, comprising determining which transmission points the mobile relay node should communicate with based on the signal measurements received from the mobile relay node.

16. A method according to claim 13, further comprising exchanging information with other base stations over a base station interface, to coordinate transmissions to the mobile relay node when the relay node operates in the second operating state.

17. A method according to claim 16, comprising exchanging one or more of the following over the base station interface: i) patterns of sub-frame assignments made by the different transmission points for the mobile relay node; ii) position information for controlling beam forming techniques used to reduce interference; iii) signal measurements reported by the mobile relay node; iv) signalling to inform another base stations that they are serving the mobile relay node so that the other base station can reserve appropriate resources for the mobile relay node; v) signalling of system information for Public Warning System related information; and vi) information to coordinate resources used by each base station for R-PDCCH and MBSFN sub-frame structure.

18. A non-transitory computer implementable instructions product comprising computer implementable instructions for causing a programmable communications device to perform the method of claim 9.

19. A non-transitory computer implementable instructions product comprising computer implementable instructions for causing a programmable communications device to perform the method of claim 13.

* * * * *